(12) United States Patent
Li

(10) Patent No.: US 6,565,319 B2
(45) Date of Patent: May 20, 2003

(54) FAN HAVING STABLE PRE-LOADING DEVICE

(75) Inventor: Chien-Chung Li, Taoyuan Hsien (TW)

(73) Assignee: Delta Electronics Inc. (TW)

( * ) Notice: Subject to any disclaimer, the term of this patent is extended or adjusted under 35 U.S.C. 154(b) by 0 days.

(21) Appl. No.: 09/924,593

(22) Filed: Aug. 9, 2001

(65) Prior Publication Data

US 2003/0059308 A1 Mar. 27, 2003

(30) Foreign Application Priority Data

Sep. 8, 2000 (TW) ...................................... 89215581 U

(51) Int. Cl.[7] .............................................. F01D 29/04
(52) U.S. Cl. ........................ 416/174; 416/104; 416/205; 415/229
(58) Field of Search ..................... 415/229; 416/104, 416/170.1, 174.2, 205, 220

(56) References Cited

U.S. PATENT DOCUMENTS 2,953,417 A * 9/1960 Horberg
3,329,845 A * 7/1967 Lear
3,746,472 A * 7/1973 Rupp ............................ 417/9
3,816,782 A * 6/1974 Dow et al. ................... 310/290
4,164,690 A * 8/1979 Muller et al. ................ 318/254
4,203,704 A * 5/1980 Saint-Amand ............ 416/93 R
4,621,977 A * 11/1986 Markwardt ..................... 416/5
4,719,352 A * 1/1988 Miyatake et al. ........... 250/351
4,958,945 A * 9/1990 Nakanishi .................... 384/512
5,997,183 A * 12/1999 Horng ......................... 384/517

* cited by examiner

Primary Examiner—Edward K. Look
Assistant Examiner—James M. McAleenan
(74) Attorney, Agent, or Firm—Birch, Stewart, Kolasch & Birch, LLP

(57) ABSTRACT

A fan having stable pre-loading device includes a stator, at least one bearing, a rotor having a blade structure, a shaft and a rigid spacer. Among these, the bearing is formed in the space of the stator. One terminal of the shaft is coupled to the stator. The elastic device is formed on the bearing. The rigid spacer is formed on and thus compresses the elastic device. Another terminal of the shaft passing the rigid spacer as well as the elastic device is coupled to the inner ring of the bearing.

8 Claims, 4 Drawing Sheets

FAN HAVING STABLE PRE-LOADING DEVICE

BACKGROUND OF THE INVENTION

1. Field of the Invention

The present invention relates to a fan, and more particularly to a fan having stable pre-loading device.

2. Description of the Prior Art

As shown in FIG. 1(a), the conventional fan 10 includes a stator 20, at least one bearing 30, a rotor 50, a shaft 60 and a spring 70. The rotor 50 further includes a blade structure 55. Besides, the shaft 60 couples the rotor 50 to the bearing 30. As such, the shaft 60 enables the blade structure 55 of the rotor 50 to rotate. The shaft 60 passes through and compresses the spring 70, and then is coupled to the bearing 30. As such, the spring 70 applies a downward force, generally called pre-loading force, on the bearing 30.

Referring to FIG. 1(a) and FIG. 1(b), the bearing 30 is positioned in the bottom of the stator 20. In addition, the bearing 30 is composed of an inner ring 31, a plurality of balls 32 and an outer ring 33. The balls 32 couple the outer ring 33 to the outer periphery of the inner ring 31. During the inner ring 31 rotates respective to the outer ring 33, the balls 32 touch the inner ring 31 as well as the outer ring 33 and thus form the first contact 35 and the second contact 36, respectively. However, the prior art suffers from the problem that the pre-loading force is unstable. For example, the contacts may shift and the pre-loading force fails to be kept constant. The problem and the reason are described in detail as follows. The blade structure 55 may move vertically or horizontally due to some reasons, such as the flow disturbs the blade structure 55. In this case, the spring 70 maybe sometimes compressed and sometimes relaxed. As such, the spring 70 fails to apply constant pre-loading force on the bearing 30, and the first contact 35 and the second contact 36 do not stay at the same positions. As a result, the fan suffers form shake, noise and abrasion.

Besides, prior art fails to adjust the pre-loading force according to the requirement of the user since the spring 70 has been formed previously and thus has no adjustable elastic coefficient.

Accordingly, there has been a strongly felt need for a novel fan having stable pre-loading to solve the above-mentioned problem. Besides, it is desired that the applied pre-loading force is adjustable.

SUMMARY OF THE INVENTION

The present invention discloses a fan having stable pre-loading device. Besides, according to the present invention, the pre-loading applied on the bearing of the fan is adjustable. The present fan includes a stator, at least one bearing, a rotor, a shaft, at least one elastic device and a rigid spacer. As shown in the enlarged portion, the stator includes a receptacle having a first thread formed on the inner periphery.

The bearing is positioned in the bottom of the receptacle. In addition, the bearing is composed of an inner ring, a plurality of balls and an outer ring. The balls couple the inner ring to the outer ring. During the inner ring rotates respective to the outer ring, the balls contact the inner ring and the outer ring, respectively.

The rotor further includes a blade structure. The shaft further includes a first terminal and a second terminal. Among these, the first terminal is coupled to the rotor. Therefore, the shaft enables the blade structure of the rotor to rotate. The elastic device (i.e. a spring) is taper and thus including one terminal having major diameter and another terminal having minor diameter. The thinner terminal, having minor diameter, is coupled to the inner ring of the bearing. The rigid spacer formed in the upper section of the receptacle is positioned on the spring and coupled to the terminal having major diameter. The second thread is formed on the outer periphery of the rigid spacer. As such, the second thread and the first thread couple the rigid spacer to the upper section of the receptacle. Besides, the second terminal passes through the central opening of the rigid spacer as well as the elastic device and then is coupled to the inner ring of the bearing. In this manner, the rigid spacer compresses the elastic device.

As described above, the blade structure does not affect the elastic device since the blade structure is separated form the elastic device. The elastic device compressed by the rigid spacer applies pre-loading force on the elastic device. If the distance between the rigid spacer and the bearing is kept constant, the pre-loading force applied on the elastic device is stable since the deformed length of the elastic device is also kept constant. As such, the first contact and the second contact of the bearing are maintained on the same position and do not move with the rotation of the blade structure. That is, the prior problems (i.e. shake, noise or abrasion) caused by the contacts moving with the vibration of the blade structure are effectively improved. Further, in the present invention, the distance between the rigid spacer and bearing is alterable and thus the pre-loading force according to the requirement of user is adjustable.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention discloses a fan having stable pre-loading device. Besides, according to the present invention, the pre-loading applied on the bearing of the fan is adjustable.

Figure 1A:
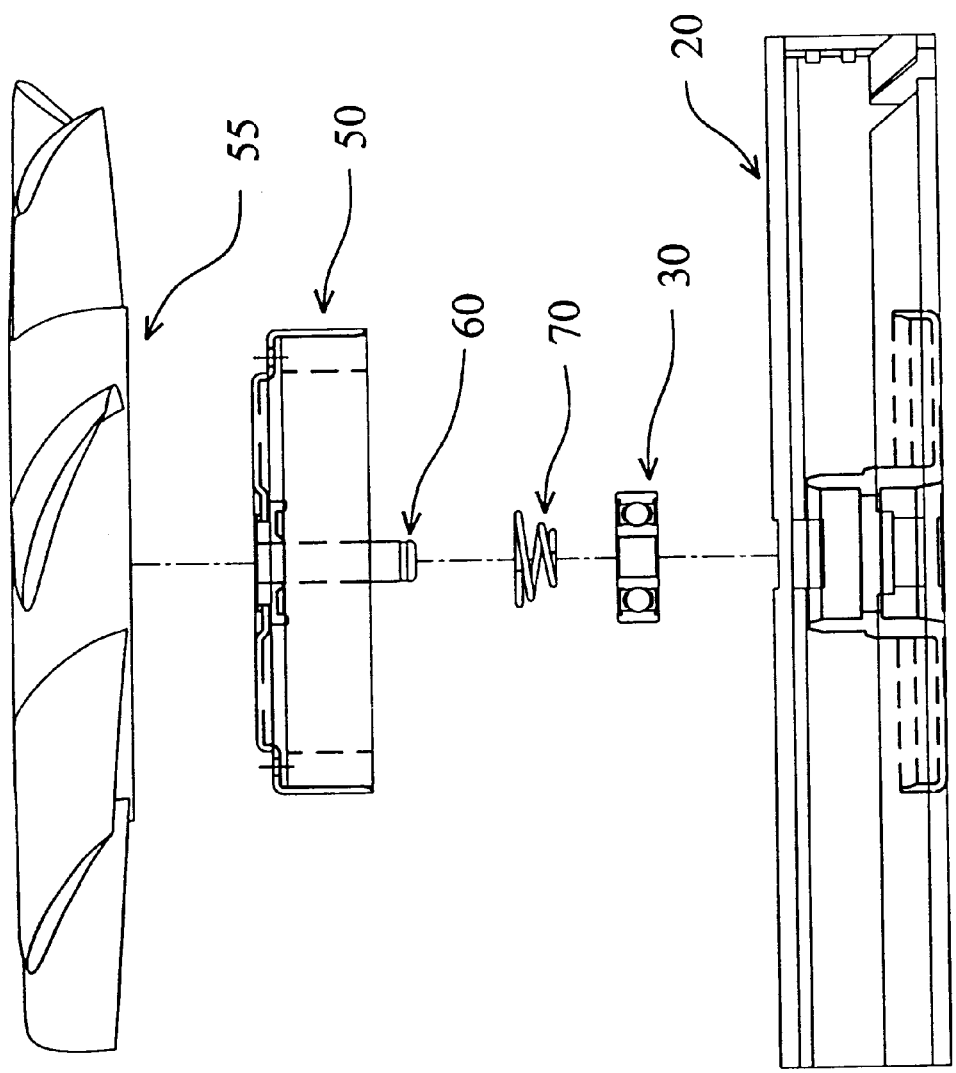
FIG. 1(a) depicts the exploded view illustrating the conventional fan.
Figure 1B:
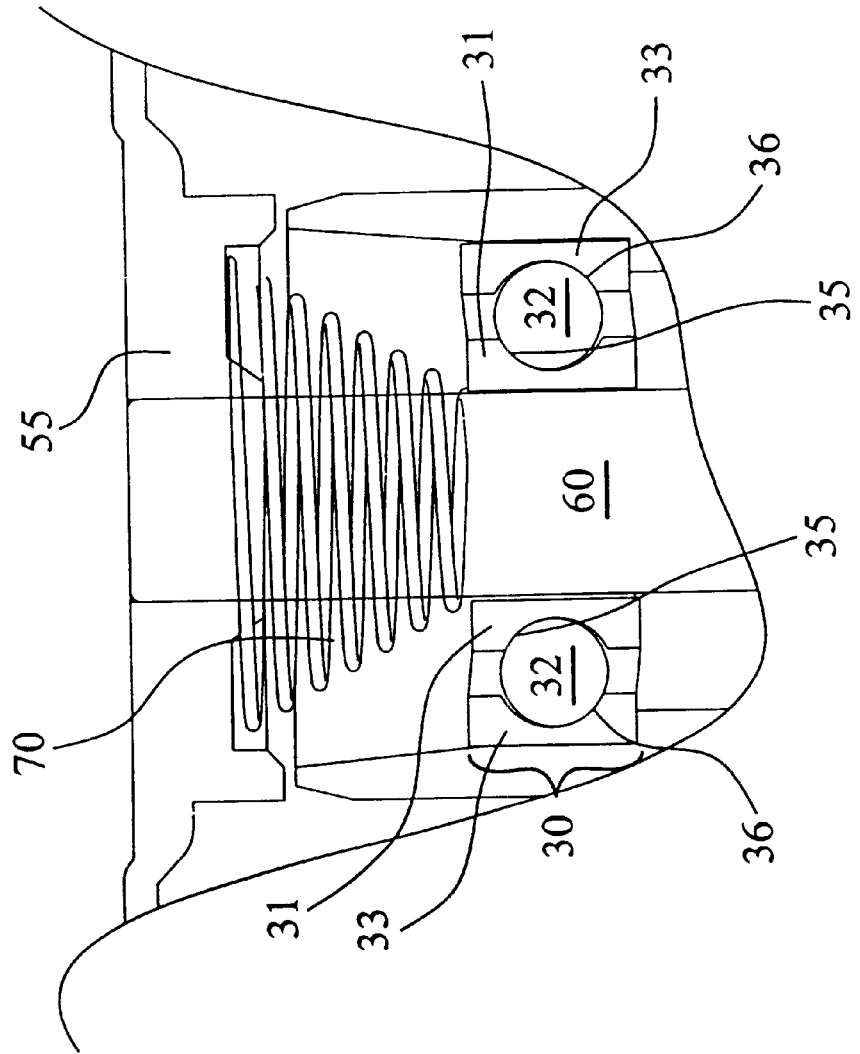
FIG. 1(b) depicts the partially enlarged view illustrating the bearing of the conventional fan shown in FIG. 1(a)
Figure 2:
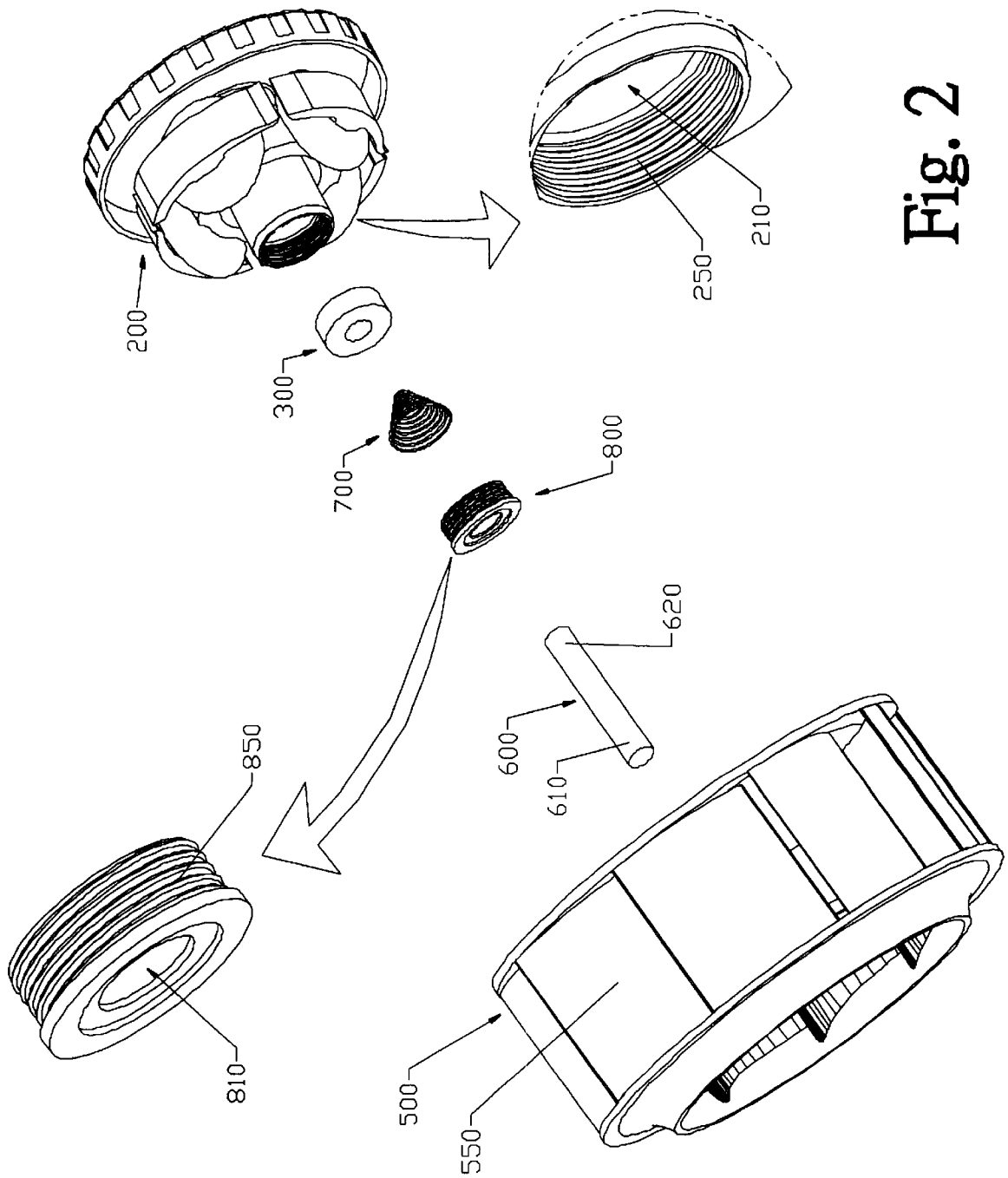
FIG. 2 depicts the exploded view illustrating the fan according to the present invention.

Referring to FIG. 2, the present fan includes a stator 200, at least one bearing 300, a rotor 500, a shaft 600, at least one elastic device 700 and a rigid spacer 800. As shown in the enlarged portion, the stator 200 includes a receptacle 210 having a first thread 250 formed on the inner periphery. having a first thread 250 formed on the inner periphery.

Figure 3:
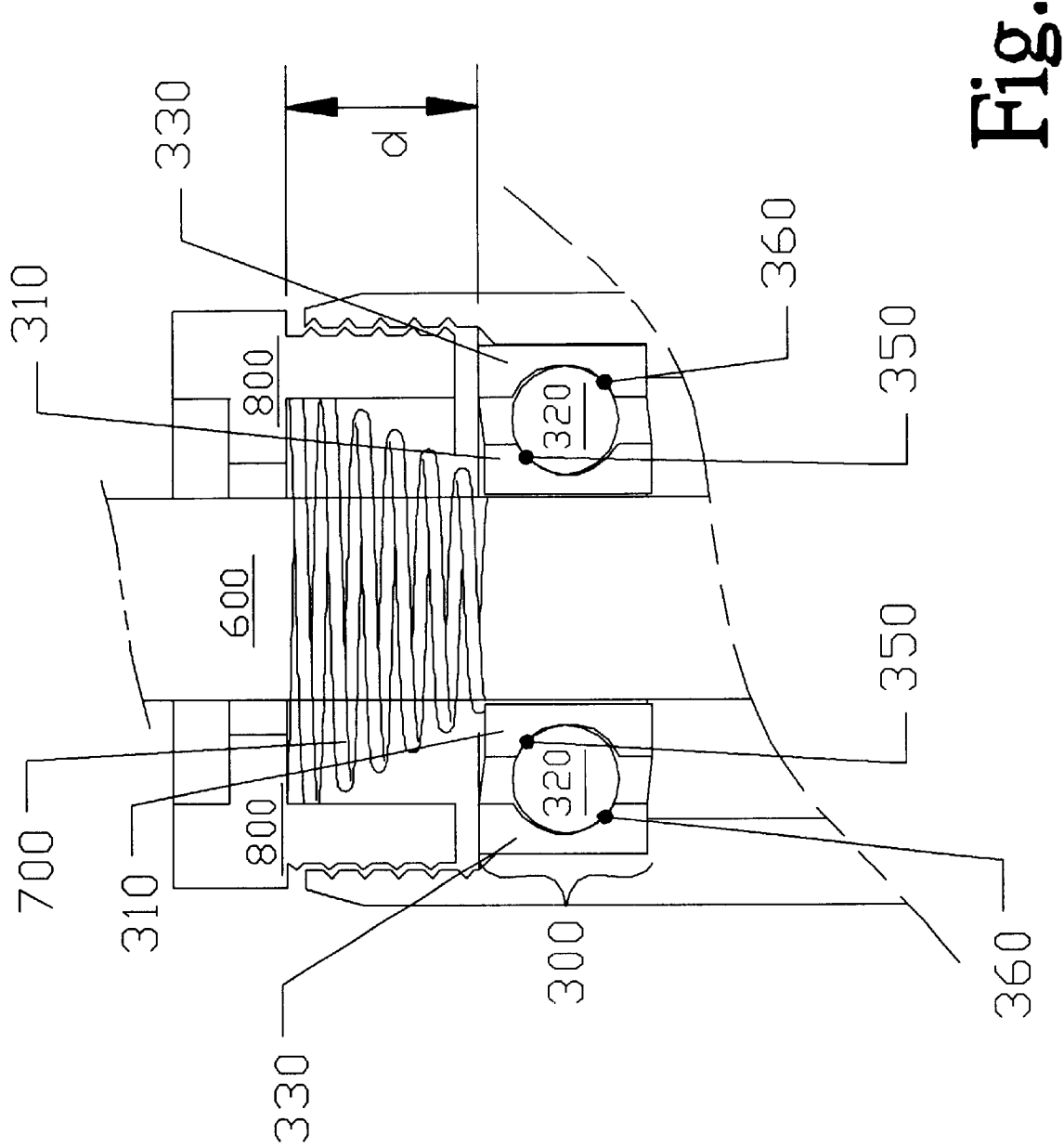
FIG. 3 depicts the partially enlarged view illustrating the bearing of the fan according to the present invention.

Referring to FIG. 2 and FIG. 3, the bearing 300 is positioned in the bottom of the receptacle 210. In addition, the bearing 300 is composed of an inner ring 310, a plurality of balls 320 and an outer ring 330. The balls 320 couple the inner ring 310 to the outer ring 330. During the inner ring 310 rotates respective to the outer ring 330, the balls 320 contact the inner ring 310 and the outer ring 330, respectively.

Referring to FIG. 2, the rotor 500 further includes a blade structure 550. The shaft 600 further includes a first terminal 610 and a second terminal 620. Among these, the first terminal 610 is coupled to the rotor 500. Therefore, the shaft 600 is enables the blade structure 550 of the rotor 500 to rotate. The elastic device 700, such as a spring 700, is taper and thus including one terminal having major diameter and another terminal having minor diameter. The thinner terminal, having minor diameter, is coupled to the inner ring 310 of the bearing 300. The rigid spacer 800 formed in the upper section of the receptacle 210 is positioned on the spring 700 and coupled to the terminal having major diameter. The second thread 850 is formed on the outer periphery of the rigid spacer 800. As such, the second thread 850 and the first thread 250 couple the rigid spacer 800 to the upper section of the receptacle 210. Besides, the second terminal 620 passes through the central opening 810 of the rigid spacer 800 as well as the elastic device 700 and then is coupled to the inner ring of the bearing 300. In this manner, the rigid spacer 800 compresses the elastic device 700.

Referring to FIG. 3, as described above, the balls 320 couple the inner ring 310 to the outer ring 330. Therefore, there is a first contact 350 formed between the inner ring 310 and the ball 320. Besides, there is a second contact 360 formed between the outer ring 330 and the ball 320. During the rotor 500 driven by the stator 200 rotates the blade structure 550, the blade structure 550, which may vibrate, does not affect the elastic device 700 since the interposed rigid spacer 800 isolates the blade structure 550 from the elastic device 700. On the other hand, the elastic device 700 compressed by the rigid spacer 800 applies pre-loading force on the bearing 300. If the distance between the rigid spacer 800 and the bearing 300 is kept constant, the pre-loading force applied on the elastic device 700 is stable since the deformed length of the elastic device 700 is also kept constant. As such, the first contact 350 and the second contact 360 of the bearing 300 are maintained on the same position and do not move with the rotation of the blade structure. That is, the prior problems (i.e. shake, noise or abrasion) caused by the contacts moving with the vibration of the blade structure are effectively improved.

Further, the pre-loading force applied on the bearing 300 by the elastic device 700 is adjustable due to the rigid spacer 800. For example, the user alters the distance d between the rigid spacer 800 and the bearing 300 to adjust the pre-loading force. Alternatively, the user alters the turns that the first thread 250 meshes with the second thread 850 to adjust the pre-loading force. The pre-loading force that the elastic device 700 applies on the bearing 300 is proportional to the turns. Although the preferred embodiment has illustrated the method for altering the pre-loading force, however, the skilled in the art can appreciate that the other methods for altering the distance d are still included by the spirit of the present invention.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A fan having stable pre-loading device, comprising:
   a stator including a receptacle;
   at least one bearing having an inner ring, formed in the receptacle;
   a rotor having a blade structure;
   a shaft, having a first terminal and a second terminal, said first terminal coupled to said rotor;
   an elastic device, formed on said bearing; and
   a rigid spacer, formed on said elastic device, said rigid spacer coupled to said receptacle and compressing said elastic device, said second terminal of said shaft passing through said rigid spacer and said elastic device then coupled to said inner ring of said bearing;
   wherein a distance between said rigid spacer and said bearing is adjustable, thereby altering pre-loading applied on said bearing.

2. The fan having stable pre-loading device according to claim 1, wherein said rigid spacer is coupled to said receptacle by means of a thread, thereby compressing said bearing.

3. The fan having stable pre-loading device according to claim 1, wherein said bearing further comprises:
   a plurality of balls; and
   an outer ring, coupled to said inner ring by means of said balls.

4. The fan having stable pre-loading device according to claim 3, wherein said elastic device is a taper spring having a thinner terminal coupled to said inner ring of said bearing.

5. The fan having stable pre-loading device according to claim 4, wherein said elastic device comprises a spring.

6. The fan having stable pre-loading device according to claim 4, wherein said bearing further comprises;
   a plurality of balls; and
   an outer ring, coupled to said inner ring by means of said balls.

7. The fan having stable pre-loading device according to claim 1, wherein said elastic device comprises a spring.

8. A fan having stable pre-loading device, comprising:
   a stator including a receptacle, an inner periphery of said receptacle having a first thread;
   at least one bearing having an inner ring, formed in the receptacle;
   a rotor having a blade structure;
   a shaft, having a first terminal and a second terminal, said first terminal coupled to said rotor;
   an elastic device, formed on said bearing; and
   a rigid spacer including an outer periphery having a second thread formed thereon, said rigid spacer formed on said elastic device and compressing said bearing; said first thread and said second thread coupling said rigid spacer to said receptacle, said second terminal of said shaft passing through said rigid spacer and said elastic device then coupled to inner ring of said bearing;
   wherein a distance between said rigid spacer and said bearing is adjustable, thereby altering pre-loading applied on said bearing.

* * * * *